Patented Nov. 24, 1925.

1,563,010

UNITED STATES PATENT OFFICE.

JOHN BREEDIS, OF PHILADELPHIA, PENNSYLVANIA, ASSIGNOR TO ROHM & HAAS COMPANY, A CORPORATION OF DELAWARE.

TANS COMPRISING A REACTION PRODUCT OF SULPHITE CELLULOSE.

No Drawing.  Application filed February 23, 1924.  Serial No. 694,772.

*To all whom it may concern:*

Be it known that I, JOHN BREEDIS, a citizen of the United States, and a resident of Philadelphia, county of Philadelphia, Pennsylvania, have invented certain new and useful Improvements in Tans Comprising a Reaction Product of Sulphite Cellulose, of which the following is a specification.

This invention relates to the production of tans and is based upon the discovery that many natural tans which are partially insoluble in water can be converted into readily soluble tans and that a tanning material of excellent quality can be produced by causing such natural tans to undergo chemical combination with sulphite cellulose liquor as obtained as an ordinary by-product from paper mills; and upon the discovery that such chemical combination will take place in the presence of free alkali. This invention is applicable to most of the natural tans, for while some of them are largely soluble, substantially all of them contain a certain percentage of insoluble material, such percentage varying with the ingredient used; for example, quebracho is very sparingly soluble in water and has to be submitted to a special "clarifying" process before it can be used in the tannery. On the other hand, hemlock, chestnut and other similar extracts contain a smaller percentage of insolubles. In addition to the benefit obtained by rendering insoluble ingredients readily soluble in water, my invention has the advantage of producing a good tan from sulphite cellulose, the abundance and cheapness of which makes its application in the tannery very desirable. I have found that tans made in accordance with this invention, where a chemical combination has taken place between the sulphite cellulose and the natural tans (whether soluble in water or insoluble) give a very much better product than either the sulphite cellulose alone or a simple mixture of the sulphite cellulose and the natural tan.

The application of my invention to a very large number of products will be readily understood by one skilled in the art from the following illustrative example:

Marrikino gum which has some tanning qualities, but which is not commonly used as a tan because of its insolubility in water, was dissolved in an equal weight of a 25% solution of caustic soda; 20 parts of this solution (10 parts of the Marrikino gum) were then mixed with 90 parts of neutralized sulphite cellulose liquor (25%) and heated to about 85°. After a period of between two and three hours had elapsed it was noted that the mixture had changed color and become of a uniform consistency, thereby indicating that a chemical combination had taken place. The mixture was then rendered slightly acid by the addition of a small amount of concentrated sulphuric acid. The product was a material soluble in, or readily miscible with, water, and exhibiting excellent tanning qualities.

If desired, the natural tan can be introduced in other forms, for example, Marrikino gum can be introduced either in the form of powder or as a 50% solution in alcohol. It is, however, desirable that the mixture should contain free alkali in order that the reaction should take place to the best advantage. Other natural tans can be substituted for Marrikino gum and varying percentages of sulphite cellulose may be used. As the conditions are changed, the temperature and time of treatment may have to be varied in some particulars, but these matters will be readily apparent to those skilled in the art. It is to be understood that the example given is by way of illustration only.

What I claim is:

1. A tan comprising the acidified reaction product of a natural tan and sulphite cellulose in an alkaline solution.

2. The method of producing a tan which comprises the step of heating together a natural tan and sulphite cellulose in the presence of free alkali until such natural tan and sulphite cellulose enter into chemical combination, and then acidifying the product.

3. The method of producing tans, which are readily soluble in water, from natural tanning materials which are partially insoluble in water, which comprises the step of causing a chemical combination to take place between such natural tanning material and sulphite cellulose in the presence of an akaline agent.

JOHN BREEDIS.